(No Model.) 2 Sheets—Sheet 1.
B. HEMPSTEAD.
BICYCLE.
No. 598,511. Patented Feb. 8, 1898.
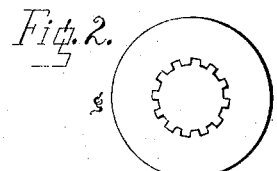
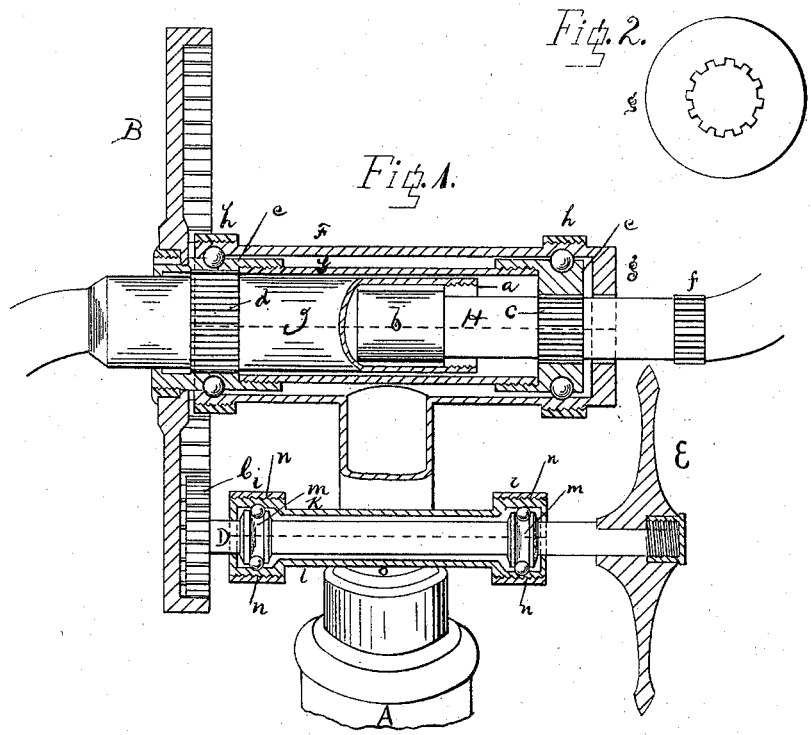
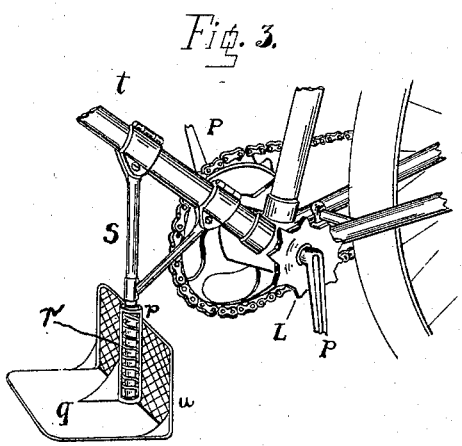
Witnesses
Louis Berger.
A. M. Pierce
Beall Hempstead.
Inventor (No Model.) 2 Sheets—Sheet 2.

B. HEMPSTEAD.
BICYCLE.

No. 598,511. Patented Feb. 8, 1898.

Witnesses
Louis Berger
A. M. Pierce

Beall Hempstead.
Inventor

UNITED STATES PATENT OFFICE.

BEALL HEMPSTEAD, OF NEW YORK, N. Y.

BICYCLE.

SPECIFICATION forming part of Letters Patent No. 598,511, dated February 8, 1898.

Application filed April 2, 1896. Serial No. 585,997. (No model.)

*To all whom it may concern:*

Be it known that I, BEALL HEMPSTEAD, a citizen of the United States, and a resident of New York city, in the county of New York and State of New York, have invented a new and useful Improvement in Bicycles, of which the following is a specification.

The object of the invention is twofold in its purpose—namely, first, to propel a bicycle by either foot or hand power, or by both combined, and by the combined hand and foot power to increase the speed of the bicycle; second, to so design a bicycle that it may be propelled from a standing or a sitting position and to construct it in such a way that the combined hand and foot power may be exerted at the same time by one person or the foot-power may be used to the exclusion of the hand-power or the hand-power may be used alone for propelling the machine. I attain these objects by the mechanism illustrated in the accompanying drawings, in which—

Figure 4:
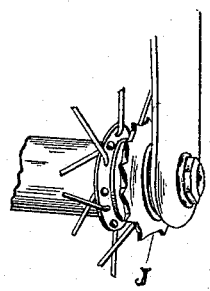
Figure 5:
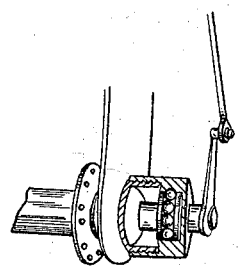
Figure 6:
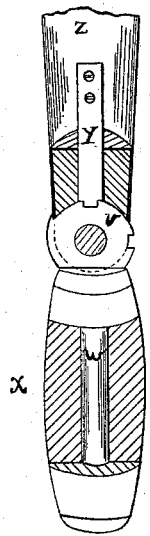
Figure 7:
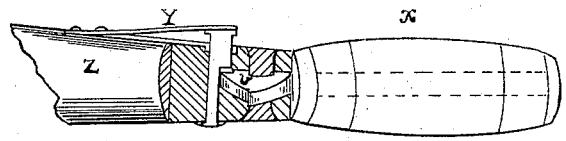

Figure 1 is a front vertical sectional view of my hand propelling mechanism; Fig. 2, an end view of the upper portion of the device; Fig. 3, a detailed view in perspective of the support for propelling the bicycle from a standing position, also illustrating one form of the combined gearing and showing the ordinary foot propelling mechanism; Figs. 4 and 5, additional modes of hand-power gearing; Figs. 6 and 7, adjustable handle for the change of position of the hand-levers from guiding to propelling and guiding the bicycle.

Similar letters refer to similar parts throughout the several views.

In Fig. 1, A represents the bicycle-head, to which the hand propelling mechanism is secured in the same manner as the ordinary handle-bar adjustment. This hand propelling mechanism consists of ball-bearing cog-wheel B, which meshes with wheel C, and which latter wheel is secured to ball-bearing shaft D, and upon the other end of this shaft or rod is sprocket-wheel E, and which revolves as cog-wheel B is revolved, and this sprocket-wheel E transmits the desired hand-power to assist in propelling the bicycle, as will hereinafter be explained. The manner in which this sprocket-wheel E is revolved is shown in Fig. 1. In this Fig. 1, F is an outside tube, and G the inside tube, of the device, and within this inside tube G are the hand-levers H and I, which in one position assist in propelling the bicycle as well as guiding it and in another position they become the ordinary handle-bars for guiding the machine. These two levers H and I are telescoped at the end, and when fitted together they are prevented from pulling apart by reason of ring *a* of lever I impinging against shoulder end *b* of lever H, this ring *a* and shoulder end *b* being threaded, and in this manner they are firmly secured to levers H and I, respectively.

In fitting the two levers H and I together ring *a* is first slipped over the end of lever H. Then shoulder end *b* would be fastened to the end of lever H. Then lever I would be secured to ring *a*. In this manner the two levers would be fastened together, as shown in the sketch.

The manner in which the two levers H and I fulfil the office in one position of propelling and guiding the bicycle and in another position of merely acting as the ordinary handle-bars for guiding is from the fact that in one position they become adjusted to the inner tube G, and in revolving it they revolve cog-wheel B, which is secured to this inner tube G. In the second position the levers become unlocked from tube G, and in this position they become the ordinary handle-bars for guiding the bicycle.

In Fig. 1 the levers are shown in the position when used for revolving wheel B. In this position they are pulled apart, so that serrated shoulder *c* of lever H and serrated shoulder *d* of lever I may engage ends *e*, and which ends are secured by thread to inner tube G. When the levers are brought together or pushed inwardly, they loosen their hold upon inner tube G and become locked to each other and to outer tube F, as follows: Ring *a* of lever I is serrated, so as to fit serrated shoulder *c* of lever H when they are brought together or pushed inwardly, and serrated shoulder *f* of lever H fits into serrated end *g* of outside tube F, end view of which is shown in Fig. 2, and as the outside tube F is secured to the bicycle, after the manner of the ordinary handle-bar adjustment, the levers when locked in this position merely guide the machine, as the serrated ends $e\ e$ of tube G have been brought over a round surface of levers H and I, where they take no hold, and the revolution of the cog-wheel has no effect upon them. In construction these tubes F and G are in sections, and the serrated ends $e\ e$ of tube G, Fig. 1, form at their upper surface beds for the ball-bearings in combination with the outside tube F, and the tubes when thus fitted together are held by screw-caps $h\ h$, as shown in the sketch, these caps having small perforations upon the top, with spring covering to keep out the dust, and at the same time permitting the oiling of the wearing parts as at present in use for the lubrication of ball-bearings. The same construction is adapted for caps $i\ i$, which likewise firmly secure the sections $k$ and $l$, forming the lower portion of the hand propelling mechanism, and within which sections ball-bearing rod or shaft D is placed, and to which shaft is secured sprocket-wheel E, and which sprocket-wheel is revolved by means of cog-wheels B and C, as previously explained. In construction this shaft D has shoulders $m\ m$, which, in combination with ends $n\ n$ of the sections $k$ and $l$, form beds for the ball-bearings, as shown in Fig. 1, and the sections, as explained, are held together by screw-caps $i\ i$. Of these sections $k$ and $l$ the lower one—i. e., section $l$—is welded or made solid to tube $o$, which tube is secured to the bicycle-head A in the usual manner of handle-bar adjustment.

In transmitting the hand-power to the wheel to assist in propelling the bicycle use may be made of either a sprocket-wheel E, Fig. 1, and chain geared to sprocket-wheel J, placed upon the front wheel of the bicycle, as shown in Fig. 4, or the sprocket-wheel may be placed upon the pedal-axle, as shown at L of Fig. 3, or use may be made of a rod adjustment, as shown in Fig. 5, the rod at one end being pivoted to a lever made ball-bearing with the front wheel of the bicycle, the rod at the other end being pivoted to a wheel adjusted to shaft D in the same manner as sprocket-wheel E.

Of the foot-power to assist in propelling the bicyle, any form of it may be used, Fig. 3 showing the present sprocket wheel and chain adjustment, and if it is desired to propel the bicycle by the combined hand and foot power the rider in the saddle gives the necessary motion to pedal-levers $p\ p$, Fig. 3, and at the same time he revolves levers H and I, Fig. 1, and which in the manner explained transmits the hand-power and assists in propelling the bicycle.

If it is desired to use the foot-power alone, the hand-levers H and I are pushed in, when they become disengaged from sprocket-tube G and take hold upon stationary tube H, as previously explained, when the levers H and I then serve the purpose of the ordinary handle-bars and the bicycle is propelled and guided in the ordinary manner. If, however, it should be the wish of the rider to propel the bicycle from a standing position, recourse is had to the support shown in Fig. 3. This support consists of base $q$, which is secured to tube $r$, and which tube fits over the lower portion of frame $s$, and this frame is firmly secured to the lower tube of the bicycle-frame, as shown in $t$ of Fig. 3. In the construction of the standing support tube $r$ is made large enough to incase a coil-spring which is fitted over the lower portion of frame $s$, a portion of tube $r$ being cut away to show the position of this spring, and its use is for the purpose of reducing the jar to the rider when the bicycle is passing over a rough surface of the road. An additional feature of construction of this support is a rectangular frame $u$, secured to base $q$ and tube $r$, the frame being of wicker-work or the like and acts in the nature of a shield and prevents the rider from moving back far enough to interfere with the revolution of the pedals $p\ p$, Fig. 3. From this standing position the bicycle may be propelled by hand alone, and to assist in revolving levers H and I, Fig. 1, the handles of the levers are so designed as to be adjustable for that purpose, as shown in Fig. 6, top view, and Fig. 7, side view, the lever being cut away at the end to exhibit the handle-adjusting mechanism. This consists of a disk $v$, pivoted to the end of the lever, the disk being notched, as shown in the figure, with an extending axle $w$, around which turns handle $x$. Engaging this disk is a metal strip or wedge, which is secured to one end of a flat spring $y$, the other end of the spring being secured to the lever $z$, Fig. 6, the spring being used to hold the strip or wedge to the desired adjustment. This wedge or flat strip extends through the end of the lever, as shown in Fig. 7, side view, and projects below the lever, so as to be easily reached when a change of position of the handle is desired, the strip being cut away in its lower half, so that when pressed up the disk is free to turn in any direction for the required adjustment of the handle. In Figs. 6 and 7 the adjustment is for that position of the handles where the levers are used as the ordinary handle-bars for guiding the bicycle. When, however, they are to be used for propelling purposes, the handles would be adjusted at right angles to the ends of the levers.

What I claim as new, and desire to secure by Letters Patent, is—

1. In a vehicle, a hand propelling device in which are comprised telescoping handle-bars H and I, adjustable ring, $a$, secured to handle-bar I, adjustable end $b$, secured to handle-bar H, corrugated shoulders $c$ and $f$, which are a part of handle-bar H, sectional outside tube F, having a corrugated end $g$, sectional inside tube G, having adjustable corrugated ends $e\ e$, toothed wheels B and C, sprocket-wheel E, a chain for transmitting power to the axle of the vehicle and a foot propelling device, the whole combined and arranged to operate substantially as shown and described.

2. In a vehicle, a hand propelling device, in which are comprised telescoping handle-bars H and I, adjustable ring $a$, secured to handle-bar I, adjustable end $b$ secured to handle-bar H, corrugated shoulders $c$ and $f$, which are a part of handle-bar H, sectional outside tube F, having a corrugated end $g$, sectional inside tube G, having adjustable corrugated ends $e$ and $e$, a lower sectional tube consisting of divisions $k$ and $l$, downward-projecting tube $o$, which fits into the bicycle-head A, in combination with toothed wheels B and C, sprocket-wheel E, a chain passing to a sprocket-wheel upon the axle of the vehicle, and the foot propelling mechanism, substantially as shown and described.

3. In a vehicle, a hand propelling device in which are comprised telescoping handle-bars, inside adjustable ring $a$ of handle-bar I, adjustable end $b$, of handle-bar H, corrugated shoulders $c$ and $f$, of handle-bar H, and corresponding shoulder of handle-bar I, in combination with the sectional inside tube G, having corrugated, adjustable ends, $e$, $e$, sectional tube F, having corrugated end $g$, screw-caps $h$, $h$, ball-bearings within the tube G, toothed wheels B and C, axle D with shoulders $m$, $m$, the axle supported by the lower tube whose sections $k$, $l$, are secured by screw-rings, $i$, $i$, wheel C, sprocket E, a chain connecting said sprocket with the driving-axle, and the foot propelling device, the whole arranged, substantially as shown and described.

4. In a vehicle, an adjustable standing or foot support adapted and arranged to support the rider while propelling the vehicle by hand, said support consisting of base $q$, tube $r$, a spring within the tube $r$, rectangular frame $u$, upright frame $s$, and lower frame $t$, substantially as shown and described.

5. In a vehicle, handle-bar Z, an axle $w$, adjustable handles $x$ arranged to rotate about on axle $w$, a notched disk pivoted to the end of the handle-bar upon the axle $w$, a metal longitudinal strip passing perpendicularly through the end of the handle-bar and cut away in its lower half for the purpose of engaging and releasing the notched disk $v$ as desired, a spring $y$ firmly secured to the strip and the handle-bar whereby the strip is held to place, all designed and arranged to act substantially as shown and described.

In testimony that I claim the foregoing as my invention I have signed my name, in presence of two witnesses, this 30th day of March, 1896.

BEALL HEMPSTEAD.

Witnesses:
 LOUIS BERGER,
 A. M. PIERCE.